United States Patent
Zhong et al.

(10) Patent No.: US 10,648,336 B2
(45) Date of Patent: May 12, 2020

(54) PHYSICAL-CHEMICAL COMPOSITE INHIBITOR FOR CONTROLLING SPONTANEOUS COMBUSTION OF LOW-RANK COAL AND METHOD OF PREPARING AND USING SAME

(71) Applicant: CHINA UNIVERSITY OF MINING AND TECHNOLOGY, Xuzhou, Jiangsu (CN)

(72) Inventors: Xiaoxing Zhong, Jiangsu (CN); Feng Wang, Jiangsu (CN); Chen Xia, Xuzhou (CN); Botao Qin, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 0 days.

(21) Appl. No.: 16/090,060

(22) PCT Filed: Dec. 4, 2017

(86) PCT No.: PCT/CN2017/114432
§ 371 (c)(1),
(2) Date: Sep. 28, 2018

(87) PCT Pub. No.: WO2018/227898
PCT Pub. Date: Dec. 20, 2018

(65) Prior Publication Data
US 2020/0095864 A1    Mar. 26, 2020

(30) Foreign Application Priority Data
Jun. 16, 2017    (CN) .......................... 2017 1 0457978

(51) Int. Cl.
*E21F 5/06*       (2006.01)
*C09K 21/06*     (2006.01)
*C09K 21/02*     (2006.01)

(52) U.S. Cl.
CPC ............... *E21F 5/06* (2013.01); *C09K 21/02* (2013.01); *C09K 21/06* (2013.01)

(58) Field of Classification Search
None
See application file for complete search history.

(56) References Cited

U.S. PATENT DOCUMENTS

| 1,399,036 | A | * | 12/1921 | Thomas | B65D 90/22 454/370 |
| 4,068,802 | A | * | 1/1978 | Goings | B05B 7/0075 239/419.5 |
| 4,169,170 | A | * | 9/1979 | Doeksen | C10L 9/10 106/277 |
| 4,199,325 | A | * | 4/1980 | Smith | C10L 9/00 206/106 |
| 4,306,895 | A | * | 12/1981 | Thompson | B65G 69/186 193/29 |
| 4,331,445 | A | * | 5/1982 | Burns | C10L 9/10 44/608 |
| 4,380,459 | A | * | 4/1983 | Netting | E21F 5/16 252/88.1 |
| 4,642,196 | A | * | 2/1987 | Yan | C09K 3/22 252/88.1 |
| 4,725,370 | A | * | 2/1988 | Greene | A62D 1/0035 169/47 |
| 5,330,671 | A | * | 7/1994 | Pullen | B01D 21/01 252/88.1 |
| 10,385,246 | B2 | * | 8/2019 | Ayambem | C04B 20/1033 |
| 2005/0161234 | A1 | * | 7/2005 | Turunc | A62C 3/04 169/45 |
| 2012/0247006 | A1 | * | 10/2012 | Davis | C10L 9/10 44/620 |
| 2015/0033619 | A1 | * | 2/2015 | Wolff | C10L 9/10 44/620 |
| 2017/0073599 | A1 | * | 3/2017 | Bai | C10L 10/00 |
| 2017/0166792 | A1 | * | 6/2017 | Ayambem | C04B 24/08 |

FOREIGN PATENT DOCUMENTS

| CN | 102966369 A | 3/2013 |
| CN | 103203089 A | 7/2013 |
| CN | 106753439 A | 5/2017 |
| CN | 107035398 A | 8/2017 |
| SU | 1652616 A1 | 5/1991 |

* cited by examiner

OTHER PUBLICATIONS

Xiao, Y., et al., "Progress on Inhibition Mechanism and Application Technology for Coal Spontaneous Combustion," *Safety and Environmental Engineering* 24(1):176-182, Jan. 2017 [with English abstract].

*Primary Examiner* — Joseph D Anthony
(74) *Attorney, Agent, or Firm* — Seed Intellectual Property Law Group LLP

(57) ABSTRACT

Disclosed is a physical-chemical composite inhibitor for controlling spontaneous combustion of low-rank coal, and methods of preparing and using the same. The composite inhibitor consists of a chelate and attapulgite, the chelate is generated by chelation of proanthocyanidin with calcium chloride. The composite inhibitor has moisture-absorbing and moisture-retaining effect, and can reduce water dissipation at low temperature. A stable oxide insulating layer such as MgO and $Al_2O_3$ insulating layer can be formed at high temperature, which can block a coal body from contacting with oxygen. In addition, the composite inhibitor can capture hydroxyl free radicals generated during the chain-cycle reaction and destroy peroxide free radicals, and can also interact with an active moiety in coal to form a stable structure such as ether linkage and hydrogen bonding, thereby achieving permanent inhibition of low-rank coal.

7 Claims, No Drawings

PHYSICAL-CHEMICAL COMPOSITE INHIBITOR FOR CONTROLLING SPONTANEOUS COMBUSTION OF LOW-RANK COAL AND METHOD OF PREPARING AND USING SAME

BACKGROUND

Technical Field

The present disclosure belongs to the field of application of underground fire prevention and extinguishing techniques in coal mines, and in particularly to a physical-chemical composite inhibitor for controlling spontaneous combustion of low-rank coal and method of preparing the same.

Description of Related Art

The resources of low-rank coal in China are abundant, but the ignition issue is quite severe. Low-rank coal contains a large amount of active functional groups including aliphatic groups such as methyl and methylene and hydroxy group, and these active functional groups have very strong oxidation activity, so that oxidation spontaneous combustion can easily occur and even a fire is caused. A fire caused by spontaneous combustion of coal can not only burn away a large amount of coal resources, but also release a large amount of toxic and detrimental gases, posing a threat to personnel health and environmental safety. This is a problem that urgently needs to be solved during safe coal mine production.

The basic principle for controlling spontaneous combustion of coal is to eliminate occurrence of coal oxidation or reduce generation and accumulation of heat during coal oxidation. Low-temperature oxidation of coal is a complicated process of free radical chain-cycle reaction of a coal-oxygen complex. During the process, free radicals serve for chain initiation and chain transfer. Therefore, selection of a suitable inhibitor can timely eliminate or reduce active functional groups or key free radicals during chain-cycle reaction while providing moisture retaining and temperature lowing of coal, and is of enormous significance for controlling spontaneous combustion of coal. At present, inhibitors for controlling spontaneous combustion of coal mainly include physical inhibitors and chemical inhibitors. The inhibition mechanism of physical inhibitors mainly is oxygen barrier and smothering as well as moisture absorption and temperature lowing. The physical inhibitors mainly are foams, gels, and water absorbent salts (such as NaCl, $MgCl_2$ and $CaCl_2$). These physical inhibitors can change physical conditions around the coal body and inhibit spontaneous combustion of coal mainly by moisture retaining, heat absorption and temperature lowing, but do not change essentially the risk of spontaneous combustion of coal, so that when moisture retaining properties of the inhibitors are exhausted, the inhibition effect will disappear. The inhibition mechanism of chemical inhibitors mainly is reduction of a number of active functional groups in coal or interruption of free radical chain-cycle reaction of a coal-oxygen complex, to inhibit oxidation spontaneous combustion of coal. The chemical inhibitors mainly are oxidants such as perchlorates, permanganates, peroxides and environmentally friendly inhibitors such as ureas, anti-aging agents, catechins. However, oxidants can release heat during reaction, resulting in increase in temperature of coal bodies, and oxidants themselves have a large risk of fires; and anti-aging agents, catechins and the like are costly, resulting in difficulty in actual field use.

BRIEF SUMMARY

Embodiments of the present invention provide a physical-chemical composite inhibitor for controlling spontaneous combustion of low-rank coal to solve the problem of low-rank coal being oxidated at low-temperature and to overcome the deficiencies of the prior art. The composite inhibitor can maintain good inhibition effect with physical moisture retaining, and can also essentially inhibit spontaneous combustion of low-rank coal according to the functions of key active functional groups during oxidation of low-rank coal. In accordance with an embodiment of the invention, a physical-chemical composite inhibitor for controlling spontaneous combustion of low-rank coal is provided, wherein the composite inhibitor consists of a chelate and an attapulgite and the chelate is generated by chelation of proanthocyanidin with calcium chloride.

A mass ratio of the proanthocyanidin to calcium chloride is 1:6 to 1:8, most preferably 1:7.

A mass ratio of the chelate to attapulgite is 1:4 to 1:6, most preferably 1:5.

In accordance with another embodiment of the invention, a method for preparing the physical-chemical composite inhibitor for controlling spontaneous combustion of low-rank coal as described above is provided.

The method for preparing a physical-chemical composite inhibitor for controlling spontaneous combustion of low-rank coal includes the following steps:
(1) proanthocyanidin and calcium chloride are dissolved and dispersed in solvent water, and thoroughly stirred for 10 to 20 min to prepare a chelate solution; and
(2) attapulgite is added to the chelate solution, and thoroughly stirred for 10 to 20 min to prepare a composite inhibitor solution.

In accordance with another embodiment of the invention, a method for using the physical-chemical composite inhibitor for controlling spontaneous combustion of low-rank coal as described above is provided.

The method for using a physical-chemical composite inhibitor for controlling spontaneous combustion of low-rank coal includes a solution of the composite inhibitor is sprayed to a residual coal region in an underground mined-out area to control spontaneous combustion of coal.

Advantageous Effect

Attapulgite in the composite inhibitor is a magnesium-rich hydrous aluminum silicate clay mineral having a chain-layered structure. It has good colloidal properties such as unique dispersion, high temperature resistance, and salt and alkali resistance, It also has good plasticity and cohesion, and strong water absorptivity. Its structure contains a large amount of zeolite water and crystal water, so that the water will not dissipate easily at low temperature and water vapor will be generated at high temperature. In addition, a stable oxide insulating layer such as MgO and $Al_2O_3$ insulating layer will be formed, which can block a coal body from contacting with oxygen. The o-dihydroxybenzene ring structure in proanthocyanidin can be subjected to chelation with $Ca^{2+}$ to form a stable "hydrogen donor". The provided hydrogen can capture hydroxyl free radicals generated during the chain-cycle reaction, and can also eliminate peroxide free radicals, thereby interrupting the free radical chain-cycle reaction. In addition, the phenolic hydroxyl group in proanthocyanidin that does not take part in the chelation can be subjected to hydrogen-bonding association with an active moiety in coal such as hydroxyl to form a stable structure. After offering hydrogen, the phenolic hydroxyl group can also interact with an active moiety such as an aliphatic group to form a stable ether linkage structure, thereby achieving the purpose of inhibiting spontaneous combustion of coal. Additionally, the structure of attapulgite contains a large amount of channels and pores, and the chelate component in the composite inhibitor can be well dispersed in these channels and pores, such that the chelate and attapulgite form a stable nested composite inhibitor. The formed composite inhibitor has moisture-absorbing and moisture-retaining effect, and can reduce water dissipation at low temperature. A stable oxide insulating layer such as MgO and $Al_2O_3$ insulating layer can be formed at high temperature, which can block a coal body from contacting with oxygen. In addition, the composite inhibitor can capture hydroxyl free radicals generated during the chain-cycle reaction and eliminate peroxide free radicals, and can also interact with an active moiety in coal to form a stable structure such as ether linkage and hydrogen bonding, thereby achieving permanent inhibition of low-rank coal.

The composite inhibitor is environmentally friendly and economic, has rich sources and stable properties, and is simple to use. Spraying a solution of the composite inhibitor to a mining area and mined-out area of low-rank coal can deactivate oxidation activity of active functional groups on the basis of physical inhibition, such that active functional groups in coal such as an aliphatic group become a stable structure, and hydroxyl free radicals generated during the reaction are captured and eliminated, thereby achieving the purpose of inhibiting spontaneous combustion of coal.

DETAILED DESCRIPTION

Embodiments of the present invention are further described in detail below. It should be noted that specific examples described herein are given solely for the purpose of illustration and are not to be construed as limitations of the present invention.

An embodiment of the present invention provides a physical-chemical composite inhibitor for controlling spontaneous combustion of low-rank coal, which consists of a chelate and attapulgite in a mass ratio of 1:4 to 1:6, the chelate is generated by chelation of proanthocyanidin with calcium chloride in a mass ratio of 1:6 to 1:8.

The mass ratios of the components both are suitable ratio ranges, and the ratios may be adjusted according to practical situations. The mass ratios achieving an optimal effect are: a mass ratio of 1:7 of proanthocyanidin to calcium chloride; and a mass ratio of 1:5 of chelate to attapulgite.

Aspects of the present invention are further described below by way of specific examples.

Example 1

For a composite inhibitor having a mass concentration of 10%, proanthocyanidin and calcium chloride were weighted in a mass ratio of 1:6, added to 1 mL water, and stirred for 10 to 20 min, to obtain a chelate solution; attapulgite was weighted in a mass ratio of 1:4 of chelate to attapulgite, added to the chelate solution, and stirred for 10 to 20 min, to obtain a composite inhibitor solution. 1 g of a sample of low-rank coal was weighted and the grade of spontaneous combustion tendency of low-rank coal should be spontaneously flammable, thoroughly stirred and mixed with the prepared composite inhibitor solution, then allowed to stand in air to dry for 24 h, and placed into an exsiccator for use.

(1) 10 mg of the coal sample was taken. A spontaneous combustion process of coal was simulated by a SDT-Q600 thermal analyzer with programmed temperature raising. The measured initial heat emission temperature of the coal sample after treatment with the inhibitor solution is 33° C. higher than that of the coal sample without the treatment. Also, the exotherm from the initial heat emission temperature to 100° C. and the exotherm from the initial heat emission temperature to 200° C. were significantly lower than those of the original coal.

(2) The inhibition rate was determined to be up to 80% by an inhibition rate determination method for the exotherm from the initial heat emission temperature to 100° C.

(3) The changes of methyl and methylene in coal with temperature before and after inhibition were tested by in situ IR spectroscopy. It was found that there is very little changes in methyl and methylene in the inhibited coal while there is significant changes in methyl and methylene in the original coal, indicating that the inhibitor can reduce oxidation of methyl and methylene in coal; and hydroxyl in the inhibited coal is significantly less than hydroxyl in the original coal, indicating that the inhibitor can reduce the presence of hydroxyl, thereby improving the property of spontaneous combustion of coal bodies.

Example 2

For a composite inhibitor having the same mass concentration as that in example 1, proanthocyanidin and calcium chloride were weighted in a mass ratio of 1:7, added to 1 mL water, and stirred for 10 to 20 min, to obtain a chelate solution; attapulgite was weighted in a mass ratio of 1:5 of chelate to attapulgite, added to the chelate solution, and stirred for 10 to 20 min, to obtain a composite inhibitor solution. 1 g of a sample of low-rank coal was weighted and the grade of spontaneous combustion tendency of low-rank coal should be spontaneously flammable, thoroughly stirred and mixed with the prepared composite inhibitor solution, then allowed to stand in air to dry for 24 h, and placed into an exsiccator for use.

(1) 10 mg of the coal sample was taken. A spontaneous combustion process of coal was simulated by a SDT-Q600 thermal analyzer with programmed temperature raising. The measured initial heat emission temperature of the coal sample after treatment with the inhibitor solution is 40° C. higher than that of the coal sample without the treatment. Also, the exotherm from the initial heat emission temperature to 100° C. and the exotherm from the initial heat emission temperature to 200° C. were significantly lower than those of the original coal.

(2) The inhibition rate was determined to be up to 86% by an inhibition rate determination method for the exotherm from the initial heat emission temperature to 100° C.

The resting conditions were the same as those in Example 1.

Example 3

For a composite inhibitor having a mass concentration of 10%, proanthocyanidin and calcium chloride were weighted in a mass ratio of 1:8, added to 1 mL water, and stirred for 10 to 20 min, to obtain a chelate solution; attapulgite was weighted in a mass ratio of 1:6 of chelate to attapulgite, added to the chelate solution, and stirred for 10 to 20 min, to obtain a composite inhibitor solution. 1 g of a sample of low-rank coal was weighted and the grade of spontaneous combustion tendency of the low-rank coal should be spontaneously flammable, thoroughly stirred and mixed with the prepared composite inhibitor solution, then allowed to stand in air to dry for 24 h, and placed into an exsiccator for use.

(1) 10 mg of the coal sample was taken. A spontaneous combustion process of coal was simulated by a SDT-Q600 thermal analyzer with programmed temperature raising. The measured initial heat emission temperature of the coal sample after treatment with the inhibitor solution is 36° C. higher than that of the coal sample without the treatment. Also, the exotherm from the initial heat emission temperature to 100° C. and the exotherm from the initial heat emission temperature to 200° C. were significantly lower than those of the original coal.

(2) The inhibition rate was determined to be up to 84% by an inhibition rate determination method for the exotherm from the initial heat emission temperature to 100° C.

The resting conditions were the same as those in Example 1.

The description above describes particularly advantageous embodiments of the present invention. It should be noted that several modifications and variations can be made by those of ordinary skill in the art without departing from the principles of the invention, and these modifications and variations should be considered within the scope of the present invention.

In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A physical-chemical composite inhibitor for controlling spontaneous combustion of low-rank coal, consisting of:
    a chelate; and
    an attapulgite,
    wherein the chelate is generated by chelation of proanthocyanidin with calcium chloride.

2. The physical-chemical composite inhibitor for controlling spontaneous combustion of low-rank coal according to claim 1, wherein a mass ratio of proanthocyanidin to calcium chloride is between 1:6 and 1:8.

3. The physical-chemical composite inhibitor for controlling spontaneous combustion of low-rank coal according to claim 2, wherein the mass ratio of proanthocyanidin to calcium chloride is 1:7.

4. The physical-chemical composite inhibitor for controlling spontaneous combustion of low-rank coal according to claim 1, wherein a mass ratio of the chelate to the attapulgite is between 1:4 and 1:6.

5. The physical-chemical composite inhibitor for controlling spontaneous combustion of low-rank coal according to claim 4, wherein a mass ratio of the chelate to the attapulgite is 1:5.

6. A method for preparing a physical-chemical composite inhibitor for controlling spontaneous combustion of low-rank coal, the composite inhibitor consisting of a chelate and an attapulgite, wherein the method comprises:
    dissolving and dispersing proanthocyanidin and calcium chloride in solvent water to form a first mixture;
    stirring the first mixture for between 10 and 20 minutes to prepare a chelate solution;
    adding attapulgite to the chelate solution to form a second mixture; and
    stirring the second mixture for between 10 and 20 minutes to prepare a composite inhibitor solution.

7. A method for using a physical-chemical composite inhibitor for controlling spontaneous combustion of low-rank coal, the composite inhibitor consisting of a chelate and an attapulgite, the chelate generated by chelation of proanthocyanidin with calcium chloride, wherein the method comprises:
    spraying a solution of the composite inhibitor to a residual coal region in an underground mined-out area to control spontaneous combustion of coal.

* * * * *